(12) United States Patent
Lin et al.

(10) Patent No.: US 8,126,212 B2
(45) Date of Patent: Feb. 28, 2012

(54) METHOD OF DETECTING MOVING OBJECT

(75) Inventors: Daw-Tung Lin, Taipei County (TW);
Li-Wei Liu, Taipei County (TW)

(73) Assignee: Natinoal Chiao Tung University,
Hsinchu (TW)

( * ) Notice: Subject to any disclaimer, the term of this patent is extended or adjusted under 35 U.S.C. 154(b) by 778 days.

(21) Appl. No.: 12/268,603

(22) Filed: Nov. 11, 2008

(65) Prior Publication Data
US 2009/0324011 A1 Dec. 31, 2009

(30) Foreign Application Priority Data

Jun. 25, 2008 (TW) ................................ 97123637 A (51) Int. Cl.
*G06K 9/00* (2006.01)
(52) U.S. Cl. ........................ 382/107; 382/103
(58) Field of Classification Search .................. 382/103, 382/107
See application file for complete search history.

(56) References Cited

U.S. PATENT DOCUMENTS

5,699,443 A * 12/1997 Murata et al. ................. 382/107
(Continued)

*Primary Examiner* — Tom Y Lu
(74) *Attorney, Agent, or Firm* — Rosenberg, Klein & Lee (57) ABSTRACT

Proposed is a method of detecting a moving object, including: providing an image-set at least including a first image and a second image correlated in a time series, the first image preceding the second image; defining a detecting region and a detecting direction so as to construct a virtual gate in the first image; estimating the motion vector in a time series; comparing, by the virtual gate, the second image with the first image so as to determine a difference therebetween in terms of an object's position and motion vector; and retrieving the object to be an effective moving object upon determination of the object as lying within the detecting region defined in the virtual gate and moving in a direction substantively the same with the detecting direction. This invention presents a moving object detection method without the need to construct a background model a priori.

17 Claims, 6 Drawing Sheets

U.S. PATENT DOCUMENTS

| | | | |
|---|---|---|---|
| 5,734,737 A * | 3/1998 | Chang et al. | 382/107 |
| 5,748,775 A | 5/1998 | Tsuchikawa et al. | |
| 6,219,436 B1 * | 4/2001 | De Haan et al. | 382/107 |
| 6,380,986 B1 * | 4/2002 | Minami et al. | 348/699 |
| 6,954,226 B2 | 10/2005 | Hsieh et al. | |
| 2003/0227973 A1 * | 12/2003 | Nishibori et al. | 375/240.16 |

* cited by examiner

METHOD OF DETECTING MOVING OBJECT

BACKGROUND OF THE INVENTION

1. Field of the Invention

The present invention relates to methods of detecting a moving object, and more particularly, to a method of detecting a moving object for use in an image monitoring system.

2. Description of the Prior Art

It is an important and yet insurmountable issue in daily life to concurrently detect and count moving objects in images with a complicated background. There are various commercially available motion-image monitoring system, but the systems fail to address the aforesaid issue.

For instance, both U.S. Pat. No. 6,954,226 and U.S. Pat. No. 5,748,775 disclose a detection method that involves detecting moving objects in images by background subtraction, but the detection method is unfit for an overly intricate background inevitably dogged by errors in whatever signals detected. Furthermore, the detection method disclosed in U.S. Pat. No. 6,954,226 entails acquiring information values by comparing a captured real-time monitored image with a standard image, and determining whether the information values are greater than a predetermined threshold value, wherein the information values greater than the threshold value indicate an object in the real-time image is in motion. However, the detection method cannot detect the direction in which an object moves.

The prior art can neither discern and count moving objects in an intricate background nor adjust flexibly a direction for detection and a range of retrieval in order to meet user needs. As a result, the prior art lacks ease of use and is flawed by inefficient monitoring. In view of this, the drawbacks of the prior art call for an immediate solution.

SUMMARY OF THE INVENTION

In light of the aforesaid drawbacks of the prior art, the present invention provides a method of detecting a moving object, comprising the steps of: providing an image-set at least comprising a first image and a second image correlated in a time series, the first image preceding the second image; defining a detecting area in an appropriate region of the first image; moving the detecting area so as to form a motion vector; combining the detecting area with the motion vector so as to construct a virtual gate defined with a detecting region and a detecting direction; and comparing, by the virtual gate, the second image with the first image so as to determine a difference therebetween in terms of an object's position, and retrieving the object as an effective moving object upon determination of the object as lying within the detecting region defined in the virtual gate and moving in a direction substantively equal to the user-defined detecting direction. This invention presents a virtual gate method for the moving object detection without the need to construct a background model a priori. The present invention utilizes motion vector analysis which detects moving objects passing through the gate along any desired direction. This method is particularly applicable to complex situations.

The present invention further provides a method of detecting a moving object, comprising the steps of: providing an image-set at least comprising a first image group and a second image group (equivalent to a first video and a second video) correlated in a time series, the first image group, which comprises a plurality of first images, preceding the second image group, which comprises a plurality of second images; defining a detecting area in an appropriate region of the images of the first image group; moving the detecting area so as to form a motion vector; combining the detecting area with the motion vector so as to construct a virtual gate defined with a detecting region and a detecting direction; and comparing, by the virtual gate, the second images of the second image group so as to determine a difference therebetween in terms of an object's position, and retrieving the object as an effective moving object upon determination of the object as lying within the detecting region defined in the virtual gate and moving in a direction substantively equal to the user-defined detecting direction.

The present invention further provides a method of detecting a moving object, comprising the steps of: providing an image-set at least comprising a first image and a second image correlated in a time series, the first image preceding the second image; defining a detecting area in an appropriate region of the first image; moving the detecting area so as to form a motion vector; combining the detecting area with the motion vector so as to construct a virtual gate defined with a detecting region and a detecting direction; defining an image picking area in the first image; and comparing the second image with the first image so as to determine a difference therebetween in terms of an object's position, and retrieving the object as an effective moving object upon determination of the object as appearing in the image picking area, lying within the detecting region defined in the virtual gate, and moving in a direction substantively equal to the detecting direction.

It is a primary objective of the present invention to provide a method of detecting a moving object so as to detect a moving object in an intricate background/environment.

Another objective of the present invention is to provide a method of detecting a moving object without the need to construct a background model a priori.

Another objective of the present invention is to provide a method of detecting a moving object so as to detect and count moving objects in an intricate background/environment.

Yet another objective of the present invention is to provide a method of detecting a moving object, wherein an area to be detected can be freely adjusted according to user's needs.

A further objective of the present invention is to provide a method of detecting a moving object, wherein the method allows a specific direction to be flexibly selected to meet user needs with a view to detecting an object moving in the specific direction.

A further objective of the present invention is to provide a method of detecting a moving object, wherein the method is adapted for use in an existing monitoring system so as to monitor and count moving objects with a cost-efficient budget.

A further objective of the present invention is to provide a method of detecting a moving object, wherein the method is adapted for use in a security and surveillance system so as to provide entry/exit control management, for example.

A further objective of the present invention is to provide a method of detecting a moving object, wherein the method is adapted for use in commercial research in order to record market analysis data, such as a visitor rate.

A further objective of the present invention is to provide a method of detecting a moving object, wherein the method is adapted for use in ecological research in order to record ecological features and lives of a variety of creatures.

A further objective of the present invention is to provide a method of detecting a moving object with ease of use and convenience in monitoring and management.

A further objective of the present invention is to provide a method of detecting a moving object, wherein a plurality of virtual gates can be defined and a plurality of specific directions can be selected flexibly to meet user needs with a view to detecting a plurality of objects moving in the specific directions.

DETAILED DESCRIPTION OF THE EMBODIMENTS

The present invention discloses a method of detecting a moving object, and employs general concepts of monitoring system and logic operation that are comprehensible to persons ordinarily skilled in the art and therefore are not described in detail hereunder for the sake of brevity. The appended drawings are schematic views which purport to show the features of the present invention and therefore do not, and need not, illustrate the present invention in a complete and comprehensive manner.

Figure 1A:
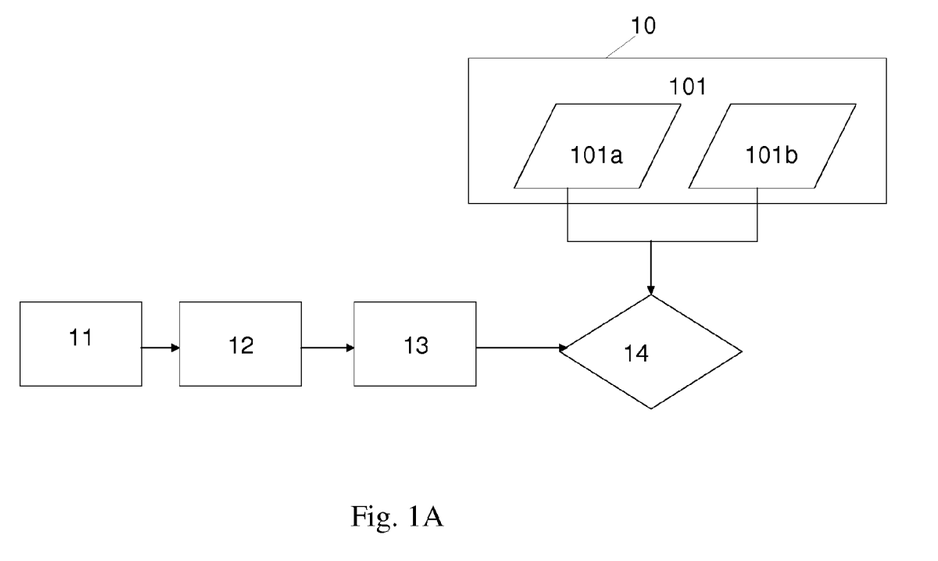
FIG. 1A is a flowchart of a method of detecting a moving object according to a first preferred embodiment of the present invention.

Referring to FIG. 1A, which is a flowchart of a method of detecting a moving object according to a first preferred embodiment of the present invention, the method comprises the following steps.

At step 10, an image-set 101 (for example, images taken by a surveillance camera) is provided. The image-set 101 at least comprises a first image 101a and a second image 101b correlated in a time series. The first image 101a precedes the second image 101b. The first image 101a and the second image 101b can be images of pedestrians, vehicles, animals, or any visible moving objects.

Figure 1B:
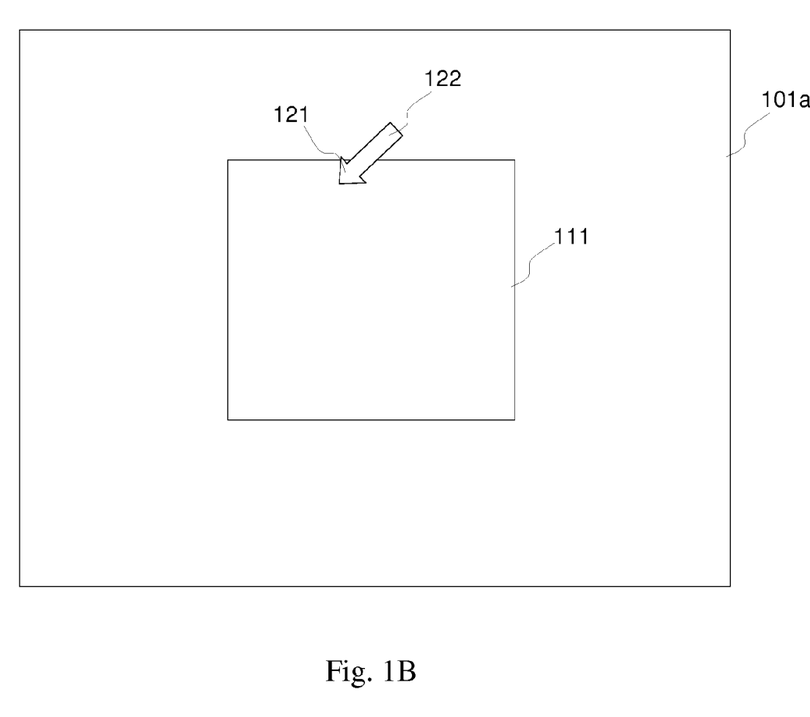
FIG. 1B is a partial schematic view of the first preferred embodiment of the present invention.

Referring to FIG. 1A and FIG. 1B, at step 11, a detecting area 111 is defined in an appropriate region of the first image 101a. The detecting area 111 is rectangular or is of any shape adjustable when necessary. The measurement unit of the detecting area 111 is an image block. The image block is of dimensions 8 pixels×8 pixels or is of any dimensions adjustable when necessary.

Referring to FIG. 1A and FIG. 1B, at step 12, the detecting area 111 is moved in a specific direction 121, so as to form a motion vector 122.

Figure 1C:
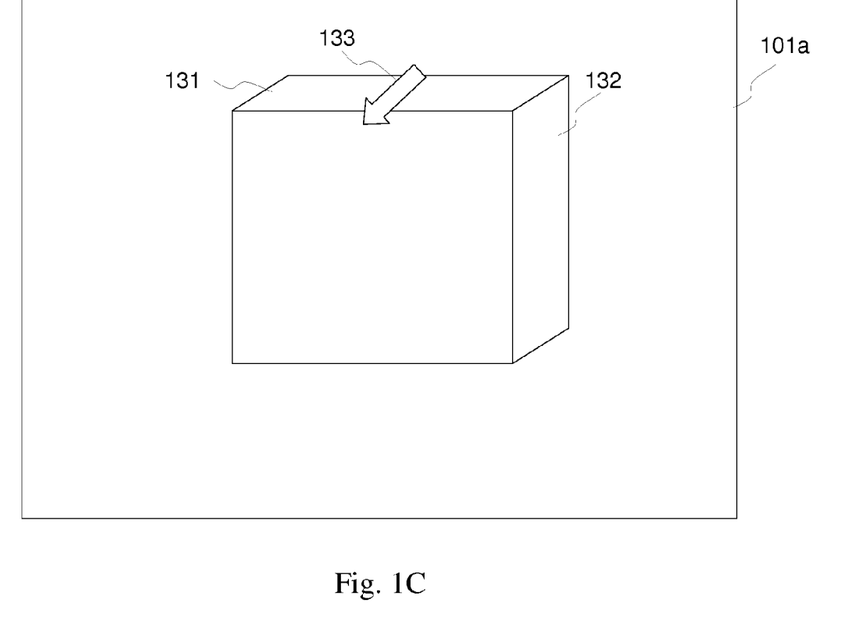
FIG. 1C is another partial schematic view of the first preferred embodiment of the present invention.

Referring to FIG. 1A, FIG. 1B and FIG. 1C, at step 13, the detecting area 111 is combined with the motion vector 122 so as to construct a virtual gate 131. Referring to FIG. 1C, the virtual gate 131 constructed is defined with a detecting region 132 and a detecting direction 133. The detecting direction 133 can be configured flexibly to meet user needs, though the configured detecting direction 133 must be unidirectional and invariable. The motion vector 122 comprises a motion angle and a motion distance, both of which are user-defined. The unit of the motion distance is pixel.

Referring to FIG. 1A, and FIG. 1C, at step 14, with the virtual gate 131, the second image 101b is compared with the first image 101a so as to determine a difference therebetween in terms of an object's position, and the object is retrieved as an effective moving object upon determination of the object as lying within the detecting region 132 defined in the virtual gate 131 and moving in a direction substantively the same with the detecting direction 133. "Substantively the same with" means the difference between the direction in which the object moves and the detecting direction 133 defined in the virtual gate 131 falls within a predetermined range.

Figure 1D:
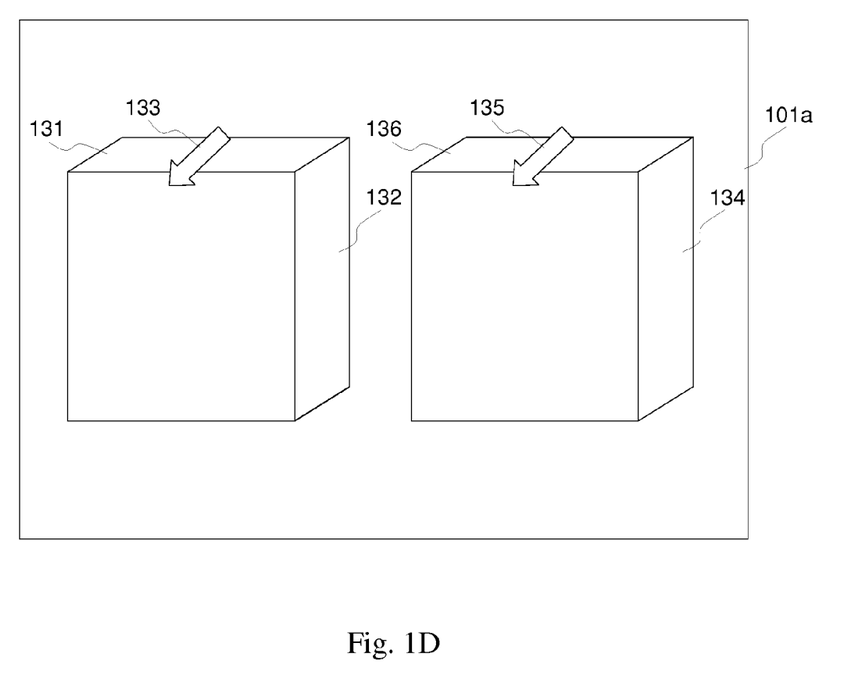
FIG. 1D is yet another partial schematic view of the first preferred embodiment of the present invention.

Referring now to FIG. 1D, with the method of detecting a moving object of the present invention, not only is motion of a single object detected, but motion of a plurality of objects can be detected concurrently. More particularly, a second detecting region 134 and a second detecting direction 135 can be defined in the same first image 101a, so as to construct a second virtual gate 136 with a view to detect a second moving object, using the same method of detecting a moving object described above. Particularly, the direction can be different from the detecting direction 133 defined in the virtual gate 131. The method is not repeated herein.

Figure 2A:
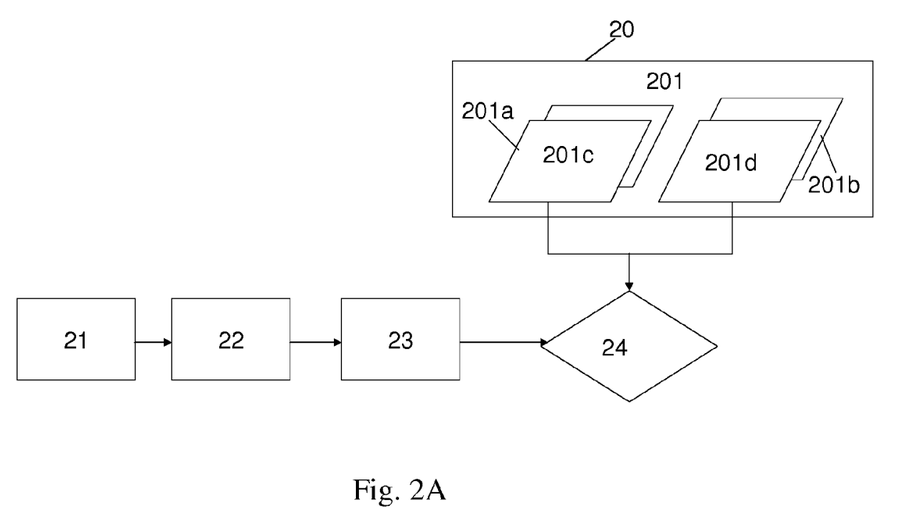
FIG. 2A is a flowchart of a method of detecting a moving object according to a second preferred embodiment of the present invention.

Referring to FIG. 2A, which is a flowchart of a method of detecting a moving object according to a second preferred embodiment of the present invention, the method comprises the following steps.

At step 20, an image-set 201 (for example, images taken by a surveillance camera) is provided. The image-set 201 at least comprises a first image group 201a and a second image group 201b correlated in a time series, wherein the first image group 201a precedes the second image group 201b. The first image group 201a comprises a plurality of first images 201c, and the second image group 201b comprises a plurality of second images 201d, wherein the images are those of pedestrians, vehicles, animals, or any visible moving objects.

Figure 2B:
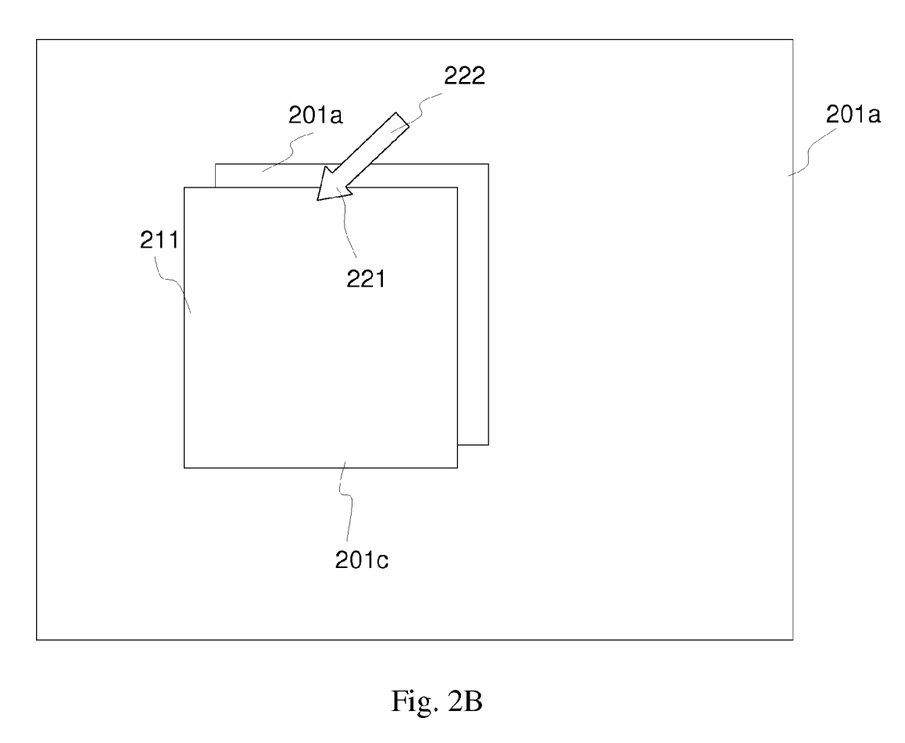
FIG. 2B is a partial schematic view of the second preferred embodiment of the present invention.

Referring to FIG. 2A and FIG. 2B, at step 21, a detecting area 211 is defined in an appropriate region of the first image group 201a. The detecting area 211 is rectangular or is of any shape adjustable when necessary. The measurement unit of the detecting area 211 is an image block. The image block is preferably of dimensions 8 pixels×8 pixels, or is of any dimensions adjustable when necessary.

Referring to FIG. 2A and FIG. 2B, at step 22, the detecting area 211 is moved in a specific direction 221, so as to form a motion vector 222.

Figure 2C:
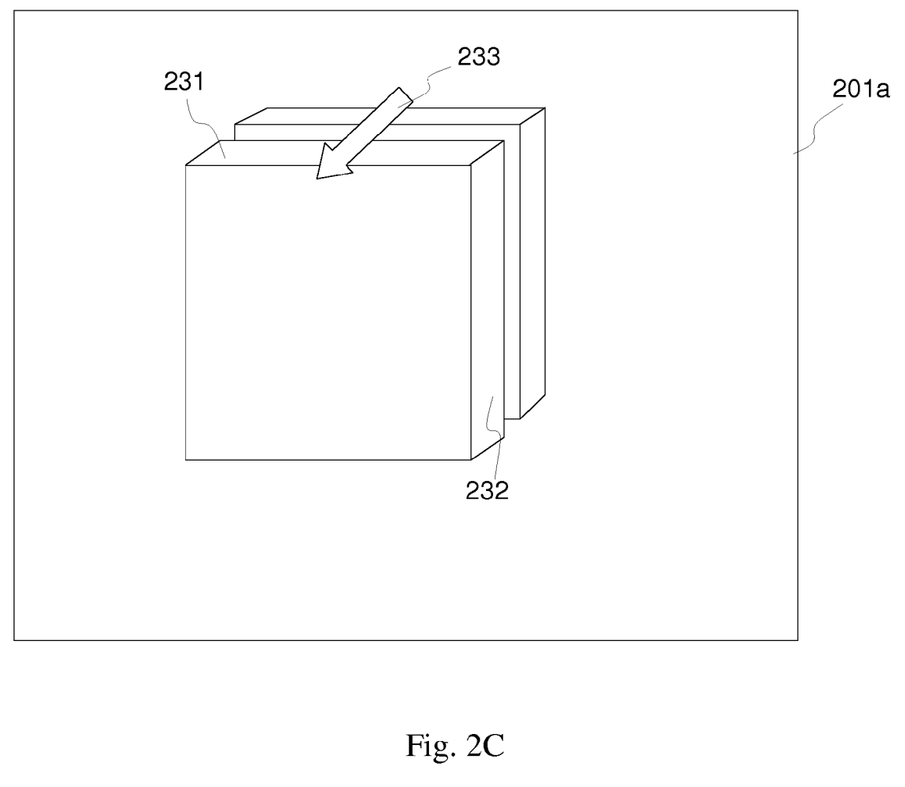
FIG. 2C is another partial schematic view of the second preferred embodiment of the present invention.

Referring to FIG. 2A, FIG. 2B, and FIG. 2C, at step 23, the detecting area 211 is combined with the motion vector 222 so as to construct a virtual gate 231. Referring to FIG. 2C, the virtual gate 231 constructed is defined with a detecting region 232 and a detecting direction 233. The detecting direction 233 is configured flexibly to meet user needs, though the configured detecting direction 233 must be unidirectional and invariable. The motion vector 222 comprises a motion angle and a motion distance, both of which are user-defined. The unit of the motion distance is pixel.

Referring to FIG. 2A and FIG. 2C, at step 24, with the virtual gate 231, the second image 201d of second image group 201b is compared with the first image 201c of the first image group 201a so as to determine a difference therebetween in terms of an object's position, and the object is retrieved as an effective moving object upon determination of the object as lying within the detecting region 232 defined in the virtual gate 231 and moving in a direction substantively equal to the detecting direction 233. "Substantively the same with" means the difference between the direction in which the object moves and the detecting direction 233 defined in the virtual gate 231 falls within a predetermined range.

Figure 3A:
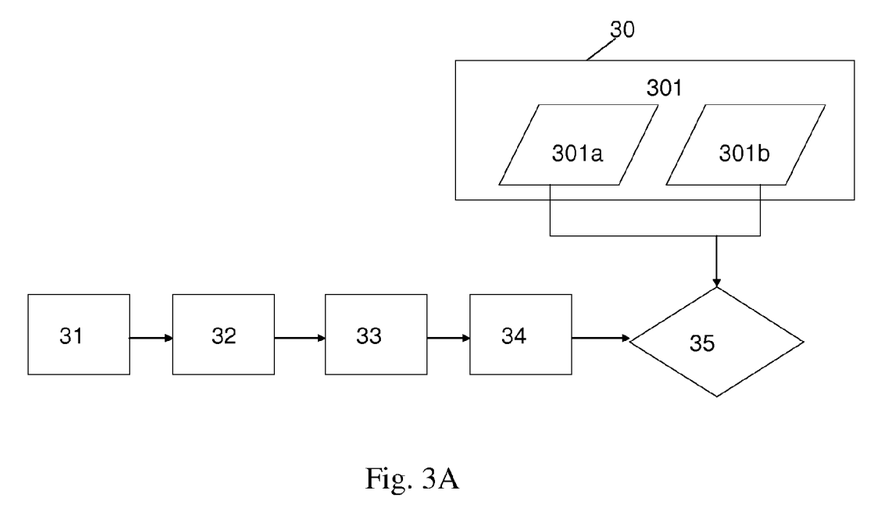
FIG. 3A is a flowchart of a method of detecting a moving object according to a third preferred embodiment of the present invention.

Referring to FIG. 3A, which is a flowchart of a method of detecting a moving object according to a third preferred embodiment of the present invention, the method comprises the following steps.

At step 30, an image-set 301 (for example, images taken by a surveillance camera) is provided. The image-set 301 at least comprises a first image 301a and a second image 301b correlated in a time series, wherein the first image 301a precedes the second image 301b. The first image 301a and the second image 301b are images of pedestrians, vehicles, animals, or any visible moving objects.

Figure 3B:
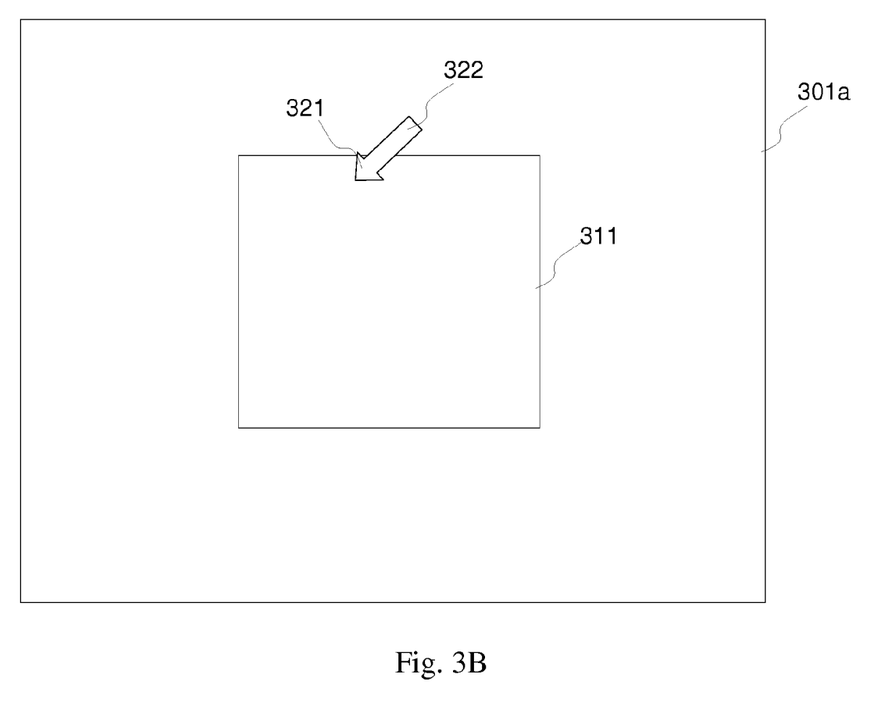
FIG. 3B is a partial schematic view of the third preferred embodiment of the present invention.

Referring to FIG. 3A and FIG. 3B, at step 31, a detecting area 311 is defined in an appropriate region of the first image 301a. The detecting area 311 is rectangular or is of any shape adjustable when necessary. The measurement unit of the detecting area 311 is an image block. The image block is preferably of dimensions 8 pixels×8 pixels, or is of any dimensions adjustable when necessary.

Referring to FIG. 3A and FIG. 3B, at step 32, the detecting area 311 is moved in a specific direction 321, so as to form a motion vector 322.

Figure 3C:
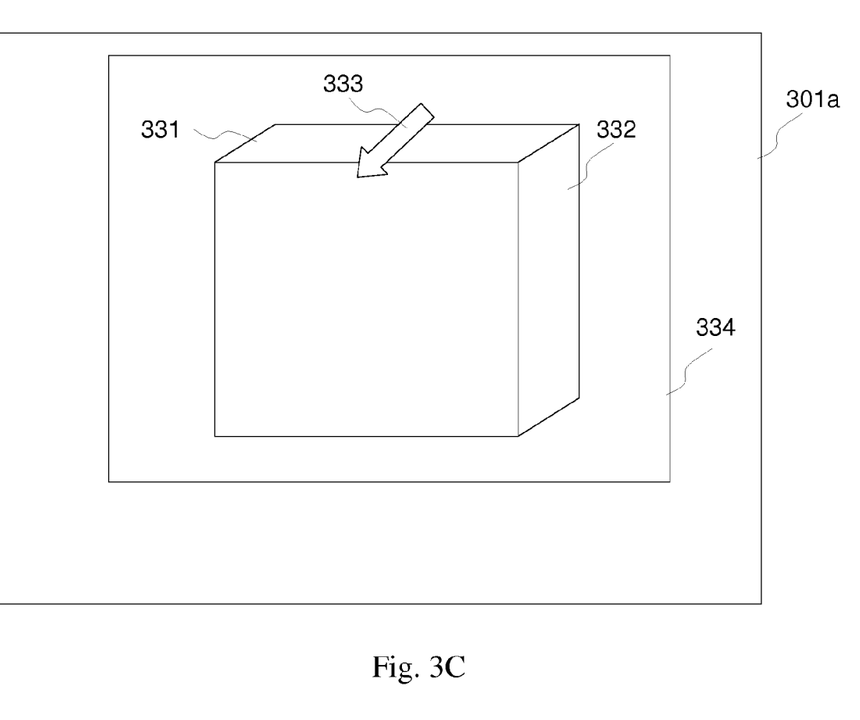
FIG. 3C is another partial schematic view of the third preferred embodiment of the present invention.

Referring to FIG. 3A, FIG. 3B and FIG. 3C, at step 33, the detecting area 311 is combined with the motion vector 322 so as to construct a virtual gate 331. Referring to FIG. 3C, the virtual gate 331 constructed is defined with a detecting region 332 and a detecting direction 333. The detecting direction 333 can be configured flexibly to meet user needs, though the configured detecting direction 333 must be unidirectional and invariable. The motion vector 322 comprises a motion angle and a motion distance, both of which are user-defined. The unit of the motion distance is pixel.

Referring to FIG. 3A and FIG. 3C, at step 34, an image picking area 334 is defined in the first image 301a. The image picking area 334 can be flexibly positioned in the virtual gate 331, with a retrieval range larger or smaller than the virtual gate 331, or can be in an offset position with respect to the virtual gate 331, adjustable at a user's discretion, so as to meet various user's needs in terms of monitoring or recording.

Referring to FIG. 3A and FIG. 3C, at step 35, with the virtual gate 331, the second image 301b is compared with the first image 301a so as to determine a difference therebetween in terms of an object's position, and the object is retrieved as an effective moving object upon determination of the object as appearing in the image picking area 334, lying within the detecting region 332 defined in the virtual gate 331, and moving in a direction substantively the same with the detecting direction 333. The definition of the phrase "substantively the same with" is the same as that disclosed in the first preferred embodiment and is therefore omitted herein for the sake of brevity.

The foregoing preferred embodiments are only illustrative of the features and functions of the present invention but are not intended to restrict the scope of the present invention. Moreover, as the contents disclosed herein should be readily understood and can be implemented by a person skilled in the art, all equivalent changes or modifications which do not depart from the spirit of the present invention should be encompassed by the appended claims.

What is claimed is:

1. A method of detecting a moving object, comprising steps of:
providing an image-set at least comprising a first image and a second image correlated in a time series, said first image preceding said second image;
defining a detecting area in an appropriate region of said first image;
moving said detecting area so as to form a motion vector;
combining said detecting area with said motion vector so as to construct a virtual gate defined with a detecting region and a detecting direction; and
comparing, by the virtual gate, said second image with said first image so as to determine a difference therebetween in terms of an object's position, and retrieving the object as an effective moving object upon determination of said object as lying within said detecting region defined in said virtual gate and moving in a direction substantively the same with said detecting direction.

2. The method of detecting a moving object of claim 1, wherein said detecting area is rectangular.

3. The method of detecting a moving object of claim 1, wherein a measurement unit of said detecting area is an image block.

4. The method of detecting a moving object of claim 3, wherein said image block is of dimensions 8 pixels multiply 8 pixels.

5. The method of detecting a moving object of claim 1, wherein said motion vector comprises a motion angle and a motion distance.

6. The method of detecting a moving object of claim 5, wherein a measurement unit of said motion distance is pixel.

7. The method of detecting a moving object of claim 1, wherein the direction in which said object moves is regarded as substantively the same with said detecting direction, provided that said object lies within said detecting region defined in said virtual gate and a difference between the direction in which said object moves and said detecting direction falls within a predetermined range.

8. The method of detecting a moving object of claim 1, further comprising steps of:
defining a second detecting area in an appropriate region of said first image;
moving said second detecting area so as to form a second motion vector;
combining said second detecting area with said second motion vector so as to construct a second virtual gate defined with a second detecting region and a second detecting direction; and
comparing, by said second virtual gate, said second image with said first image so as to determine a difference therebetween in terms of an object's position, and retrieving said object as an effective second moving object upon determination of said object as lying within said second detecting region defined in said second virtual gate and moving in a direction substantively the same with said second detecting direction.

9. The method of detecting a moving object of claim 8, wherein the direction in which said object moves is regarded as substantively the same with said second detecting direction, provided that said object lies within said second detecting region defined in said second virtual gate and a difference between the direction in which said object moves and said second detecting direction falls within a predetermined range.

10. A method of detecting a moving object, comprising the steps of:

providing an image-set at least comprising a first image group and a second image group correlated in a time series, said first image group, which comprises a plurality of first images, preceding said second image group, which comprises a plurality of second images;

defining a detecting area in an appropriate region of the images of said first image group;

moving said detecting area so as to form a motion vector;

combining said detecting area with said motion vector so as to construct a virtual gate defined with a detecting region and a detecting direction; and comparing, by said virtual gate, the second images of said second image group so as to determine a difference therebetween in terms of an object's position, and retrieving said object as an effective moving object upon determination of said object as lying within said detecting region defined in said virtual gate and moving in a direction substantively equal to said detecting direction.

11. A method of detecting a moving object, comprising steps of:

providing an image-set at least comprising a first image and a second image correlated in a time series, said first image preceding said second image;

defining a detecting area in an appropriate region of said first image;

moving said detecting area so as to form a motion vector;

combining said detecting area with said motion vector so as to construct a virtual gate defined with a detecting region and a detecting direction;

defining an image picking area in said first image; and comparing said second image with said first image so as to determine a difference therebetween in terms of an object's position, and retrieving said object as an effective moving object upon determination of said object as appearing in said image picking area, lying within said detecting region defined in said virtual gate, and moving in a direction substantively the same with said detecting direction.

12. The method of detecting a moving object of claim 11, wherein said detecting area and said image picking area are rectangular.

13. The method of detecting a moving object of claim 11, wherein a measurement unit of said detecting area and of said image picking area is an image block.

14. The method of detecting a moving object of claim 13, wherein said image block is of dimensions 8 pixels multiply 8 pixels.

15. The method of detecting a moving object of claim 11, wherein said motion vector comprises a motion angle and a motion distance.

16. The method of detecting a moving object of claim 15, wherein a measurement unit of said motion distance is pixel.

17. The method of detecting a moving object of claim 11, wherein the direction in which said object moves is regarded as substantively the same with said detecting direction, provided that said object appears in said image picking area, lies within said detecting region defined in said virtual gate, and a difference between the direction in which said object moves and said detecting direction falls within a predetermined range.

* * * * *